United States Patent

[11] 3,578,165

[72] Inventor Robert C. Boose
 Pryor, Okla.
[21] Appl. No. 803,598
[22] Filed Mar. 3, 1969
[45] Patented May 11, 1971
[73] Assignee Escoa Fintube Corporation
 Pryor, Okla.

[54] METHOD AND APPARATUS FOR MANUFACTURING RADIALLY FINNED HEAT EXCHANGE TUBING
14 Claims, 7 Drawing Figs.

[52] U.S. Cl. ................................................. 219/107,
 219/62
[51] Int. Cl. ................................................. B23k 9/02
[50] Field of Search ........................................ 219/107,
 62, 124, 137, 102

[56] References Cited
UNITED STATES PATENTS

| | | | |
|---|---|---|---|
| 2,039,690 | 5/1936 | Trainer | 219/62X |
| 2,965,744 | 12/1960 | Busse | 219/107 |
| 3,047,712 | 7/1962 | Morris | 219/107 |
| 3,246,116 | 4/1966 | Anderson et al. | 219/124 |
| 3,377,459 | 4/1968 | Brown, Jr. et al. | 219/107 |
| 3,435,183 | 3/1969 | Vagi | 219/107 |

*Primary Examiner*—D. F. Duggan
*Attorney*—Jackson and Jones

ABSTRACT: A method and apparatus are disclosed for manufacturing radially finned heat exchange tubing. In accordance with the method, one end of a solid metal L-shaped strip is initially secured to the outer periphery of the tube. The foot of the strip is directly urged against the tube at a plurality of points in advance of a welding station, as for example, by forming rollers. The welding station is energized to continuously weld the foot of the strip to the tube while the tube is rotated and advanced longitudinally. The apparatus disclosed includes a plurality of adjustable forming rollers mounted approximately in the plane of the welding station. Each of the forming rollers includes an annular slot for receiving and guiding the leg of the metal strip in a plane perpendicular to the axis of the tube. The edges of the rollers are disposed adjacent the outer periphery of the tube so that the foot of the strip is forced against the tube as it travels over the guide rollers.

Patented May 11, 1971

3,578,165

INVENTOR.
ROBERT C. BOOSE
BY Jackson + Jones
ATTORNEYS

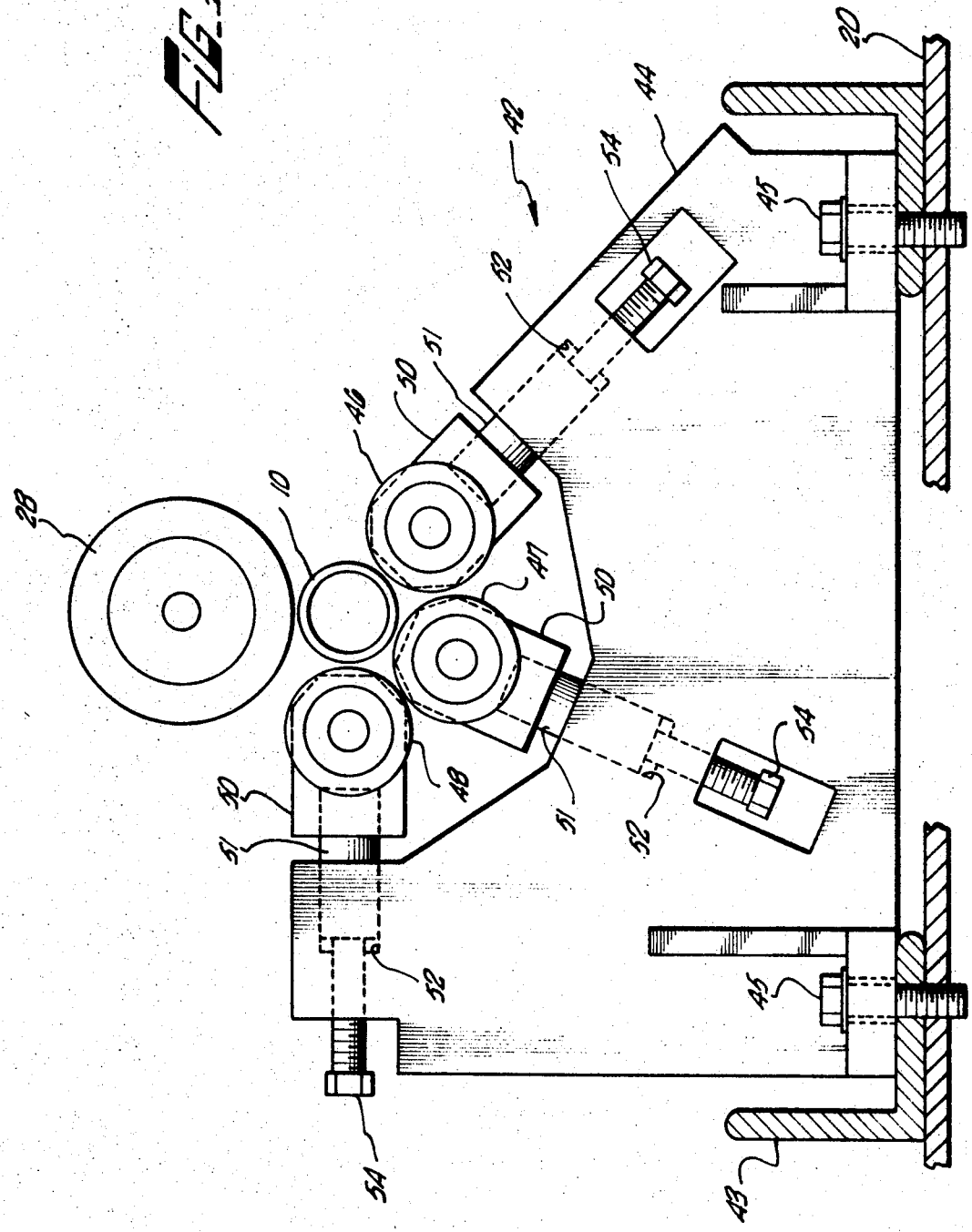

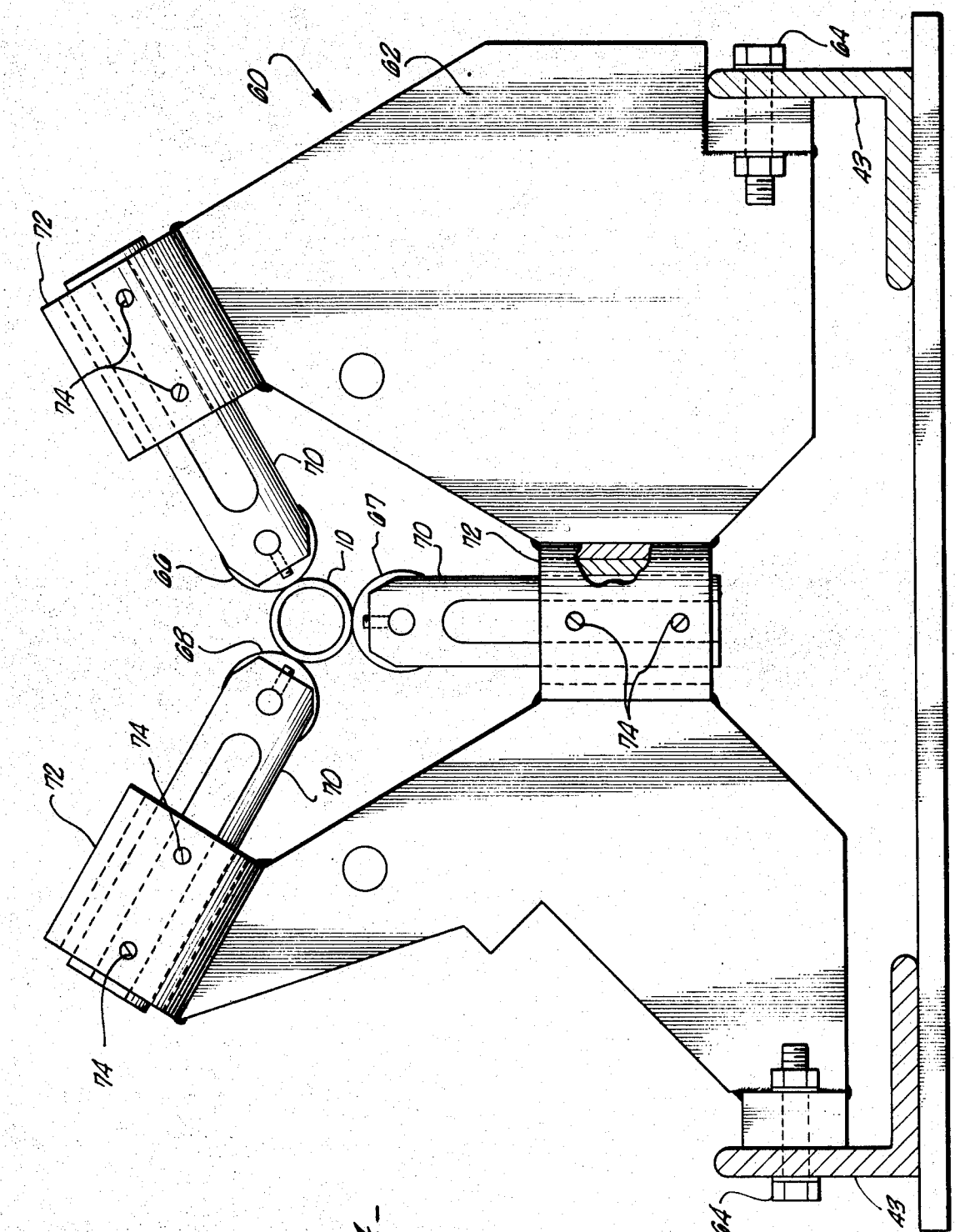

Patented May 11, 1971

INVENTOR.
ROBERT C. BOOSE

BY Jackson & Jones
ATTORNEYS

METHOD AND APPARATUS FOR MANUFACTURING RADIALLY FINNED HEAT EXCHANGE TUBING

BACKGROUND OF THE INVENTION

1. Field of the Invention

This invention relates to heat exchange tubes and more particularly to a method and apparatus of manufacturing a radially finned heat exchange tube.

2. Description of the Prior Art

Tube-type heat exchangers are used in a wide variety of applications for transferring heat from one fluid to another. For example, a plurality of tubes may be arranged within a casing in a parallel configuration for extracting heat from the hot exhaust gases of turbines. In this application, water is normally circulated within the tubes while the hot exhaust gases are circulated over the external surfaces of the tubes. Such exhaust heat recovery systems generally dictate the use of extended heat transfer surfaces. Moreover, the high temperatures encountered dictate the use of relatively thick fin stock in forming the extended heat transfer surfaces.

Solid finned tubing is widely used for such high temperature applications because of its high strength and resistance to tip burn-off. Solid finned tubing is normally manufactured by welding a fin or strip of metal in a helical path around the tube. Several methods have been used in the past to secure solid fin stock to heat exchange tubes. For example, solid fin stock has been completely wound around a tube and the tube with the formed fin in place has been placed in a furnace where the fin is brazed to the outer surface of the tube. This brazing method is very expensive. Also the finned tube produced by this method can not be used in environments in which the temperature exceeds the melting point of the solder.

A fillet welding technique has also been utilized in the past to secure a solid fin stock to a heat exchange tube. Fillet welding requires specialized welding equipment. This method is also expensive and does not permit the fins to be closely spaced due to the room required between the fins for the welding operation.

Radial finned tubes have also been manufactured by butt welding the edge of the fin directly to the outside surface of the tube. The butt welding method also requires specialized welding and forming equipment. This method may result in weak fin sections or poor conduction between the fin and the tube at various points unless the welding operation is carefully performed.

Solid finned tubing has also been manufactured in the past by spot welding the foot of an L-shaped fin around the outside of the tube by means of welding wheels. In this method the welding wheels forced the foot of the fin against the outer surface of the tube and thereby formed the fin into the helix. Such welding wheels are normally formed of copper or other soft metals which are good electrical conductors. An L-shaped section is more difficult to bend or form around the periphery of a tube or mandrel than a flat strip. For this reason the use of the weld wheel to perform the forming operation has limited the thickness of the fin stock which could be used in this method. Furthermore, the use of welding wheels made of copper or other soft metal resulted in an intolerable amount of wear to the welding wheels requiring frequent replacement.

SUMMARY OF THE INVENTION

Briefly described, the present invention comprises a method and apparatus for manufacturing helically wound solid finned tubing on a welding machine having a welding station. In accordance with the method, a solid metal L-shaped strip having an elongated leg and a perpendicularly extending foot is supplied to the welding station during the forming and welding steps. The foot of a free end of a strip is initially secured to the tube, as for example by spot welding. The tube is then rotated and simultaneously advanced past the welding station in a direction parallel to the tube axis. The foot of the strip is urged against the tube at a plurality of points in advance of the welding station and the leg of the strip adjacent such points is guided in a plane extending at a right angle to the tube axis. In this manner, the strip is formed into a continuous spiral surrounding the tube.

The welding station is energized to continuously weld the foot of the strip to the tube while the tube is rotated. If desired, the welding station may not be energized until the tube has been initially rotated through a predetermined angle, e.g. 360°. This procedure provides an unwelded portion of the strip adjacent the spot welded end to allow the strip to adjust to the correct helical pitch determined by the relative rate of tube rotation and linear advancement.

An apparatus is also provided for carrying out the process which includes a plurality of separate forming rollers which may be made of hard material such as steel and positioned in a plane adjacent the welding station. The forming rollers urge the foot of the strip against the tube at the plurality of points in advance of the welding station. The forming rollers are provided with annular slots for receiving and guiding the leg of the strip along a plane which is perpendicular to the axis of the tube. The welding station includes a welding wheel made, for example, of copper for continuously welding the foot of the metal strip to the tube after the strip has passed through the forming rollers. Preferably three forming rollers are positioned in approximately the plane of the welding wheel. The use of such forming rollers removes any appreciable forming stresses from the weld wheel. This reduces the wear on the weld wheel, thereby reducing maintenance problems.

A support fixture including three rollers spaced at 120° intervals around the tube in advance of the weld wheel is also provided to accommodate the bending stresses encountered during the forming process. The support rollers and the forming rollers are radially adjustable to accept tubes having a wide range of diameters.

The radial finned tube produced in accordance with the present invention has a high strength due to its L-shaped cross section. Furthermore, the heat transfer characteristics of the finned tube are greatly improved because of the large heat transfer surface provided by the welded foot.

DESCRIPTION OF THE DRAWINGS

FIG. 3 is a front view of the forming assembly shown in FIG. 2;

FIG. 4 is a front view of the tube support assembly shown in FIG. 2;

DESCRIPTION OF THE PREFERRED EMBODIMENT

Figure 1:
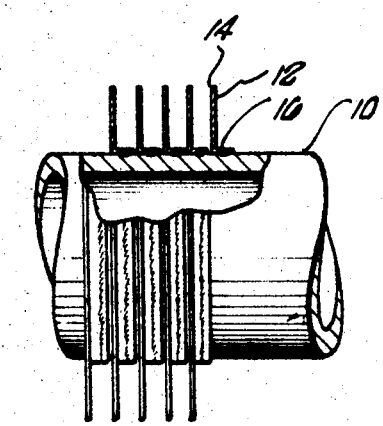
FIG. 1 is a side elevation view partially broken away of a radial finned tube constructed in accordance with the present invention.

Referring now to FIG. 1, there is shown a heat exchange tube 10 which may be made, for example, of steel with an L-shaped radially extending fin 12 welded to the outer surface of the tube. The fin 12 comprises an elongated leg portion 14 and a foot portion 16 extending perpendicularly to the leg. The foot portion 16 may be welded to the outer periphery of the tube 10 by an overlapping spot weld. The fin element 12 is wound in a spiral form along the length of the tube forming in effect a series of separated fins extending at right angles to the outer surface of the tube. The fin may be provided with any convenient spacing between turns within the limits of the forming and welding apparatus. The fin 12 may be formed from any desired gauge of metal up to the limit of the forming capabilities of the apparatus. For example, the fin may be formed from a strip of suitable metal, such as steel, having a thickness in the range from 20—60 thousandths of an inch. The foot portion need only be wide enough, i.e. three-sixteenth of an inch or less, to provide a sufficient lateral surface to be welded to the tube by the weld wheel of the welding machine, as will be described in more detail. The foot portions of adjacent turns may abut against each other along the length of the tube or may overlap.

Figure 2:
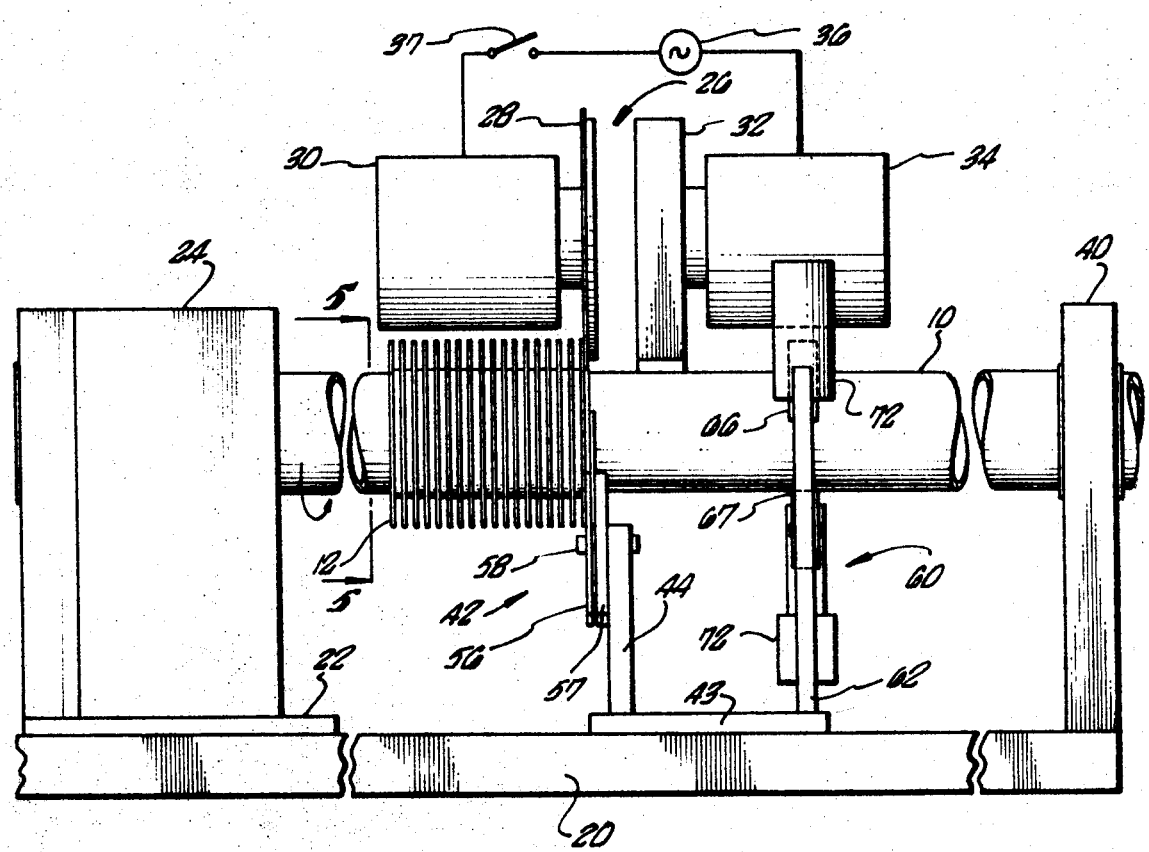
FIG. 2 is a side elevation view of an apparatus for manufacturing the finned tubing of FIG. 1.

Referring now to FIG. 2, there is illustrated a machine for helically forming and welding an L-shaped metal strip around the tube 10. The machine includes a base 20 having a track 22 which is engaged by a driving unit 24. The driving unit 24 is connected to one end of the tube 10. When energized the driving unit 24 rotates the tube, for example in the clockwise direction, while simultaneously pulling the tube along the track 22 and past a welding station indicated generally at 26. The welding station 26 includes a weld wheel 28 rotatably mounted on a support 30. A ground wheel 32 is rotatably mounted on a support 34 and engages the tube in advance of the weld wheel. An alternating current source is connected between the weld and ground wheels through a switch 37 in a conventional manner. One or more support stations 40 are positioned along the base 10 to hold the tube in a horizontal position during the forming and welding process. Tubes of 50 or more feet in length may be handled by the apparatus of FIG. 2 with the provision of a suitable number of support stations located on either side of the welding station.

A forming assembly indicated generally at 42 is provided with three forming wheels shown in more detail in FIG. 3 for guiding the L-shaped fin strip around the outer periphery of the tube during the forming process. A support fixture 60 is positioned in advance of the welding station 26 to provide lateral support for the tube 10 during the forming process, as will be explained in more detail.

Referring now to FIG. 3, a front view of the forming assembly 42 is illustrated. A frame 44 is secured to the base 20 of the welding machine by means of suitable bolts 45. A pair of angle iron supports 43 are positioned between the frame 44 and the base 20 for mounting the support fixture 60, as will be described in more detail in connection with FIG. 4. The forming assembly 42 includes three forming rollers 46, 47 and 48 which are rotatably supported on movable heads 50, as illustrated. The heads 50 are secured to rectangular posts 51 which are slidably mounted in rectangular slots 52 in the frame 44, as shown. Bolts 54 threadably engage the frame and are rotatably secured to the posts 51 so that rotation of the bolts 54 moves the heads 50 toward or away from the tube axis to accommodate tubing of different diameters. As illustrated in FIG. 3, the forming roller 46 is mounted at approximately 4 o'clock with respect to the weld wheel 28 and the roller 48 is mounted at approximately 9 o'clock. The forming roller 47 is positioned symmetrically between the rollers 46 and 48. Adjacent forming wheels are linearly movable along intersecting axes which form an included angle of approximately 75°.

Each of the forming wheels 46, 47 and 48 comprises a thin outer disc 56 and a relatively thick inner disc 57, both of which are rotatably mounted on the heads 50 by means of a headed shaft 58 as may best be seen in FIG. 2. The annular groove, or slot which is formed between the discs 56 and 57 accommodate the leg 14 of the L-shaped fin 12. The forming rollers 46, 47 and 48 are radially adjusted for each different size of tube 10 so that the foot portion 16 of the fin 12 is forced against the tube 10 as it is drawn around the forming rollers. The forming rollers 46, 47 and 48 are disposed in a plane which may be coplanar with the weld wheel 28 or spaced a small distance from the weld wheel 28 in advance thereof depending upon the fin spacing desired.

Referring now to FIG. 4, the support fixtures 60 includes a frame 62 which is secured to the angle support members 46 by means of suitable bolts 64. Three supporting rollers 66, 67 and 68 are rotatably mounted on posts 70 as illustrated. The posts 70 are slidably mounted within cylindrical members 72 by means of bolts 74 so that the support rollers may be moved toward or away from a central axis to accommodate tubing of varying sizes. These support rollers 66, 67 and 68 are mounted along axes which intersect the center of the tube 10 at angles of 120° as shown. The support rollers 66, 67 and 68 are moved into engagement with the tube 10 and provide support for the lateral or bending stresses imparted to the tube during the forming process.

Figure 5:
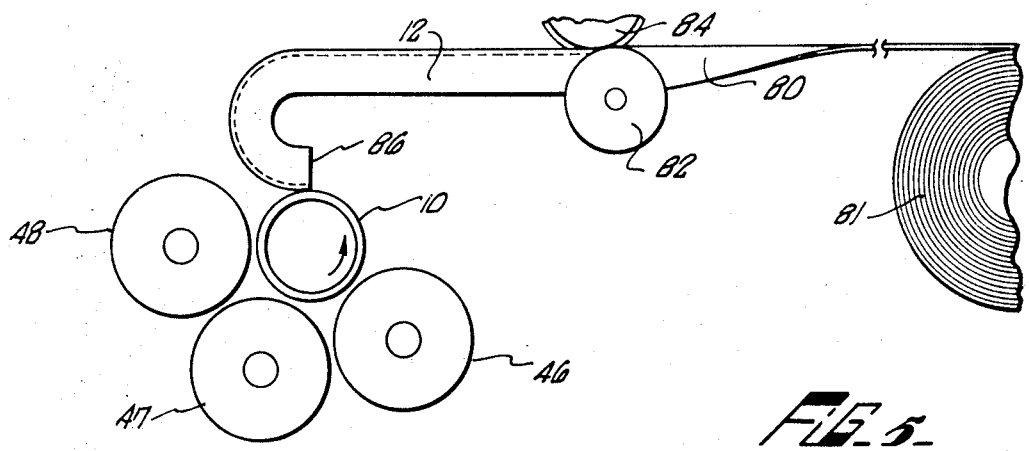
FIG. 5 is a diagrammatic front view of the tube and forming assembly taken generally along the line 5-5 of FIG. 2 illustrating the step of initially welding the strip to the tube.
Figure 6:
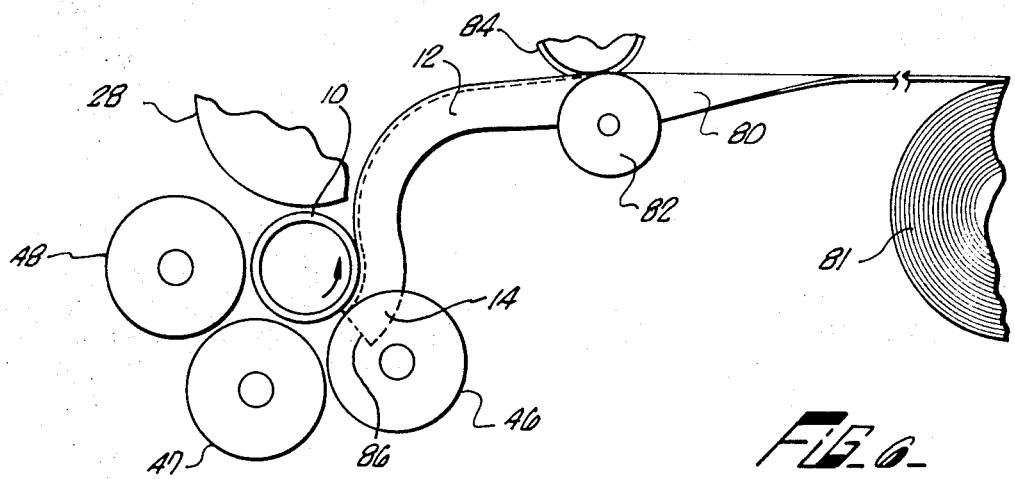
FIG. 6 is a diagrammatic front view of the tube and forming assembly taken generally along the line 5-5 of FIG. 2 illustrating the initial forming step.
Figure 7:
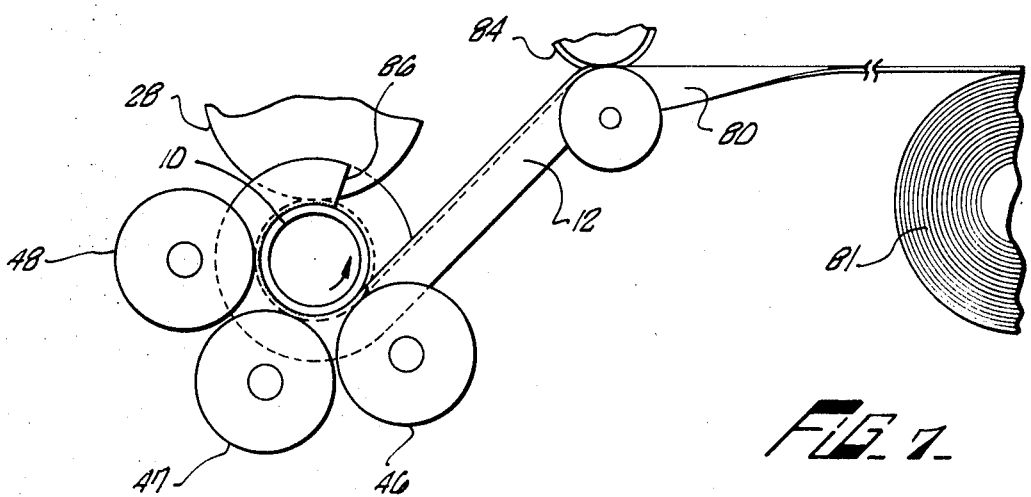
FIG. 7 is a diagrammatic front view of the tube and forming assembly taken generally along the line 5-5 of FIG. 2 showing the position of the formed fin after one revolution of the tube.

Referring now to FIGS. 5, 6 and 7, the method for initially starting the forming and welding operation is illustrated. In FIG. 5, a flat strip of fin stock or metal 80 is fed between a pair of foot forming rollers 82 and 84. The rollers 82 and 84 roll a foot in the strip 80 to provide the L-shaped strip 12. A first or free end 87 of the L-shaped strip is initially pulled in front of the weld wheel (not shown in FIG. 5) and the foot portion of the end 87 is spot welded to the tube 10 by the weld wheel. The driving unit 24 is then actuated to turn the tube 10 in a counterclockwise direction and to simultaneously pull the tube in a direction parallel to its longitudinal axis past the welding wheel 28.

In FIG. 6 the first end 87 of the strip 12 has been fed into the first forming roller 46 and the leg portion 14 thereof has entered the annular slot in the forming roller. The driving unit 24 continues to rotate the tube 10 through a predetermined angle until the strip has adjusted to the correct helical pitch. At this time the welding wheel is energized to initiate the continuous welding operation. The angle through which the tube 10 is rotated may be sufficient, for example, to provide one complete turn of the strip 12 around the tube 10. The step of initiating the continuous welding operation only after the fin has been wound through a predetermined angle eliminates the necessity of precisely lining up the initial weld to insure a uniform pitch for the welded fin. After the tube 10 has been wrapped with the desired length of fin stock, the tube may be removed from the welding machine and the initial unwelded portion of the strip 12, that is from the point at which the continuous welding operation begins and the first end may be removed from the tube to provide a tube with a uniform helically wrapped radial fin.

The method and apparatus described above provides a durable radial finned tube with good heat transfer characteristics between the fin and the tube with the use of relatively inexpensive apparatus. While there has been shown but one preferred embodiment of the method and apparatus for carrying out this invention, modifications and alterations to each will be apparent to those skilled in the art without departing from the scope and spirit of the invention.

I claim:

1. A method of manufacturing a helically wound solid finned tube on a welding machine having a welding station which comprises the steps of:
    continuously supplying a solid metal L-shaped strip having an elongated leg and a perpendicularly extending foot,
    securing the foot of a first end of the strip to the tube,
    rotating the tube in one direction and simultaneously advancing the tube past the welding station in a direction parallel to the axis thereof,
    directly contacting and urging the foot of the strip against the tube at a plurality of points in advance of the welding station and simultaneously guiding the leg of the strip adjacent said points in a path which is perpendicular to the axis of the tube to continuously form the strip into a spiral, and
    energizing the welding station to continuously weld the foot of the strip to the tube while rotating the tube.

2. The method as defined in claim 1 wherein the step of forming the strip into a spiral comprises feeding the metal strip into a plurality of forming rollers in advance of the welding station, each of the forming rollers defining an annular slot therein for receiving the elongated leg of the strip and an outer periphery for urging the foot of the strip against the tube.

3. The method as defined in claim 2 including the step of energizing the welding station after the tube has been rotated through a predetermined angle to provide an unwelded portion of the strip adjacent the first end thereof to allow the strip to adjust to the correct helical pitch prior to the welding step.

4. The combination as defined in claim 3 including the step of supporting the tube at three spaced points around its periphery in advance of the welding station to accommodate the bending stresses resulting from the forming operation.

5. The method as defined in claim 4 wherein the step of forming the strip into a spiral further comprises feeding the strip into three spaced rollers positioned along a plane substantially perpendicular to the axis of the tube and positioning the roller nearest the welding station at an angle of approximately 90° with respect to the point at which the foot of the strip is welded to the tube.

6. The method as defined in claim 5 wherein the step of continuously supplying the solid metal L-shaped strip includes the step of passing a flat metal strip between a pair of foot forming rollers.

7. The method as defined in claim 6 wherein the step of continuously welding the foot portion of the strip to the tube comprises directing the foot of the strip under a weld wheel and conducting welding current from the weld wheel through the foot and the tube.

8. The method of manufacturing a helically wound solid finned tube on a welding machine including a weld wheel, a ground wheel and at least two fin forming rollers positioned in advance of the weld wheel and approximately in the plane thereof, each of the forming rollers defining an annular slot therein, which comprises the steps of:

continuously supplying a solid metal strip which is to become the spiral fin, forming a foot on the strip which extends at right angles to an elongated leg portion thereof, securing the foot of a first end of the strip to the tube, rotating the tube in one direction and simultaneously advancing the tube past the ground and weld wheels in a direction parallel to the axis thereof, with the ground wheel in contact with the tube and the weld wheel in contact with the foot of the strip, feeding the leg portion of the strip into the annular slot in the forming rollers to force the foot of the strip against the tube, and supplying welding current to the weld and ground wheels while the tube is rotating to continuously weld the foot to the tube.

9. The method as defined in claim 8 including the step of supplying the welding current to the weld and ground wheels only after the tube has been rotated through a predetermined angle to provide an unwelded portion of the strip adjacent the first end thereof to allow the strip to adjust to the correct helical pitch.

10. The method as defined in claim 9 including the step of feeding the strip through a third forming roller which forms the foot of the strip against the tube in advance of the weld wheel.

11. In an apparatus for forming and welding a solid metal L-shaped strip having an elongated leg and a perpendicular extending foot around a heat exchange tube, the combination which comprises:

a weld wheel, means for rotatably mounting the weld wheel to provide clearance between the weld wheel and the tube at one point sufficient to accommodate the foot of the metal strip, a ground wheel, means for rotatably mounting the ground wheel for engagement with the tube at a point in advance of the weld wheel, a source of potential, means for connecting the source of potential between the weld and ground wheels, at least two forming rollers, each of the forming rollers defining an annular slot therein for receiving the leg of the metal strip, means for rotatably mounting the forming rollers in a plane substantially coincident with the plane of the weld wheel and with a clearance between each of the weld wheels and tube sufficient to accommodate the foot of the strip whereby the foot of the strip is urged against the tube by the outer periphery of the forming wheels while the leg of the strip is guided along a plane substantially perpendicular to the tube axis as the strip passes through the forming wheels and, means for supporting the tube at a position spaced from the weld wheel to accommodate bending stresses imparted to the tube during the forming operation.

12. The combination as defined in claim 11 including a third forming roller rotatably positioned adjacent the tube to urge the foot of the strip against the tube as it is guided through the third forming roller, the third forming roller being positioned in the plane of said pair of forming rollers.

13. The combination as defined in claim 12 wherein the means for supporting the tube to accommodate bending stresses comprises three support rollers mounted for rotatably engaging the periphery of the tube at approximately 120° intervals around the tube.

14. The combination as defined in claim 13 wherein each of the forming and support rollers is mounted for radial movement toward and away from the tube to accommodate different sizes of tubing.